June 8, 1965   E. R. TEWKSBURY   3,188,133
REMOVABLE AND REVERSIBLE AUTOMOBILE
TRUNK SEAT APPARATUS
Filed Dec. 21, 1961   4 Sheets—Sheet 3
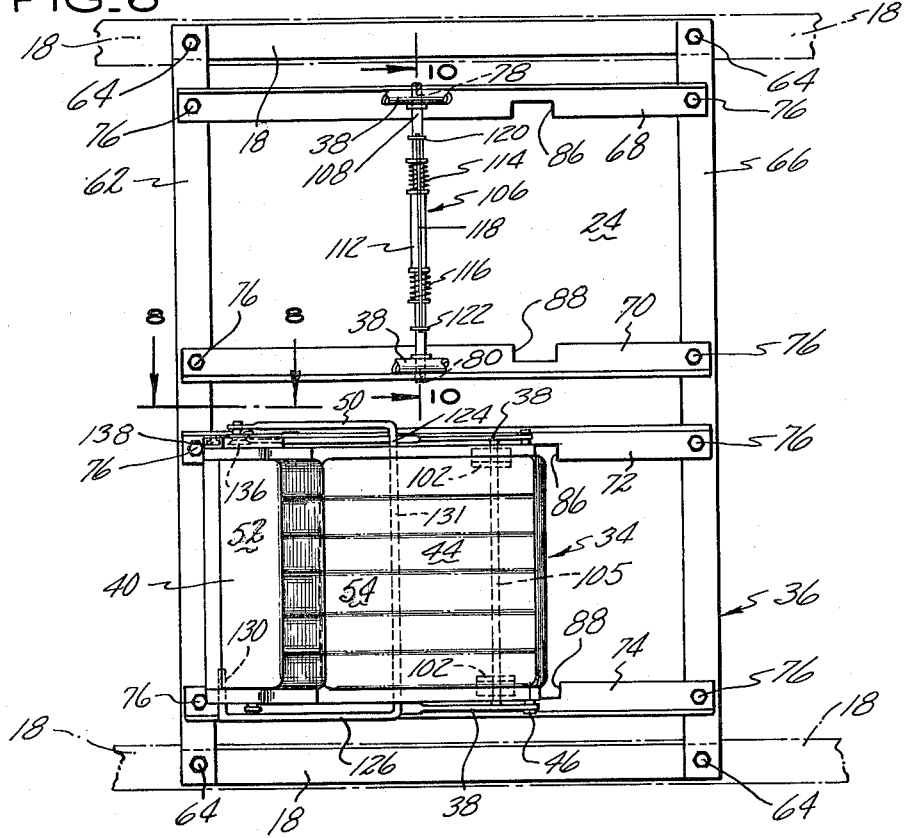
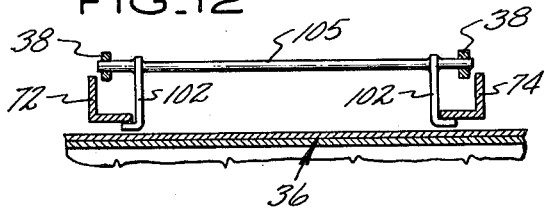
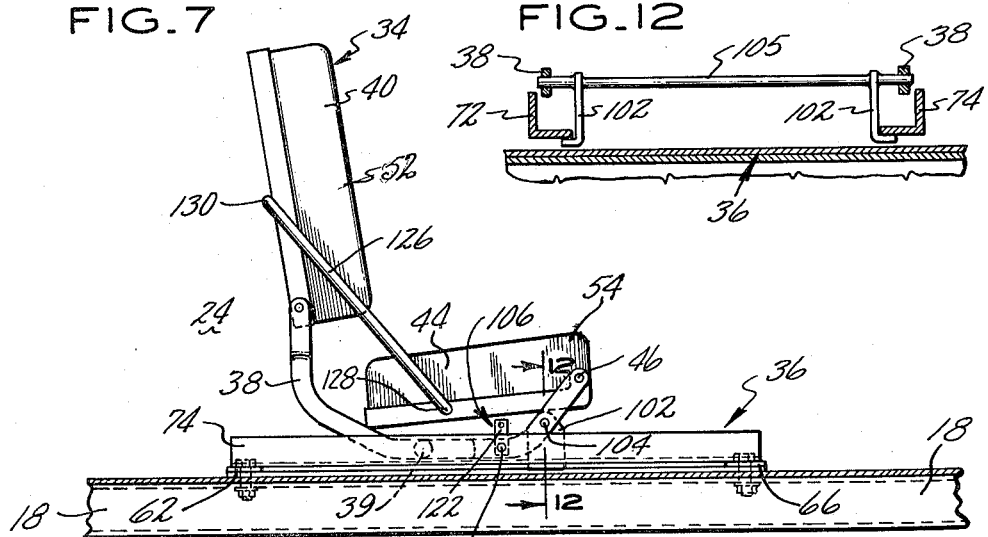
INVENTOR
EARL R. TEWKSBURY
BY Alan E. Steele
ATTORNEY June 8, 1965

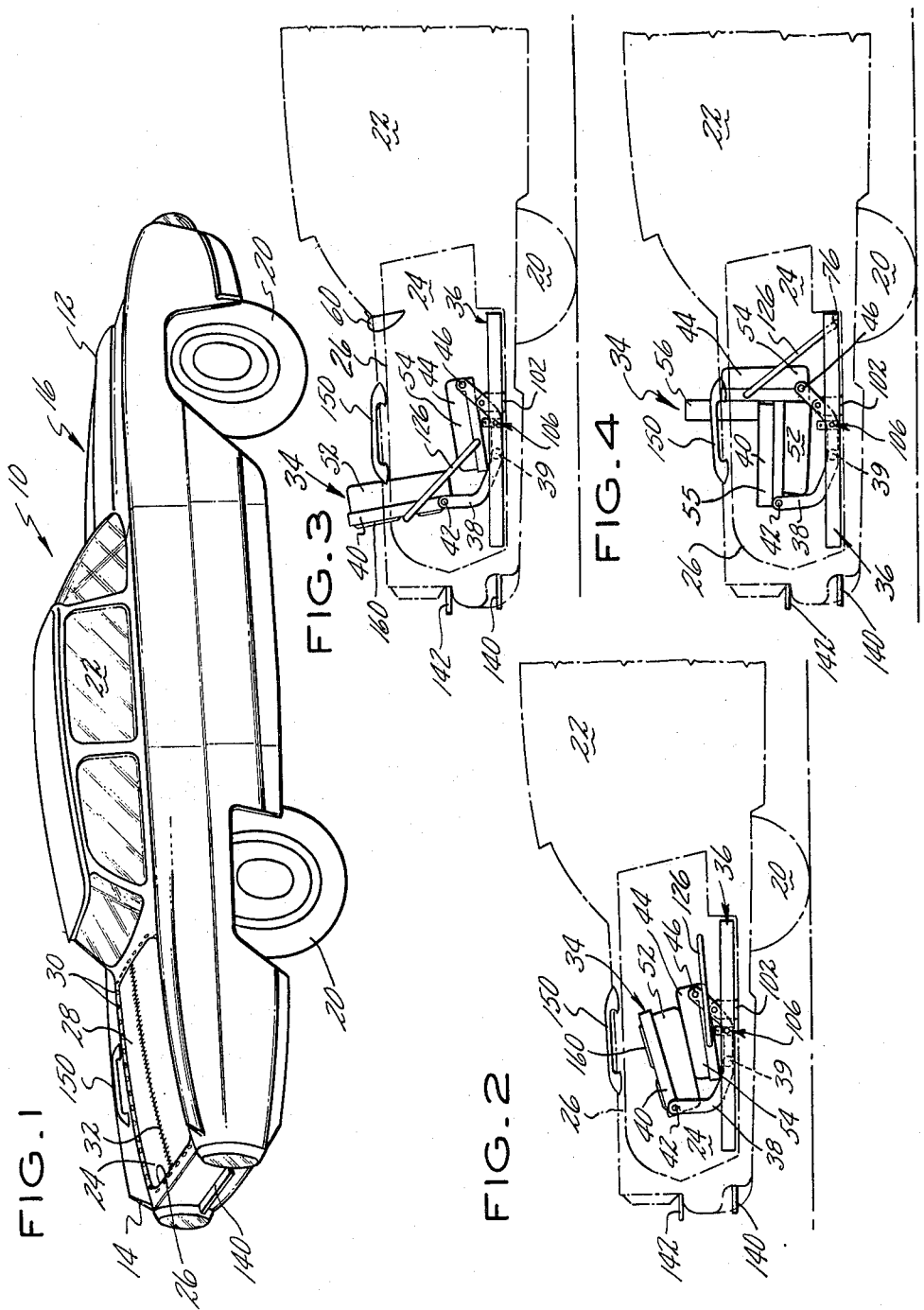

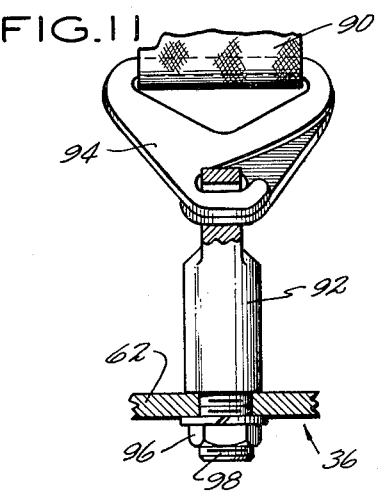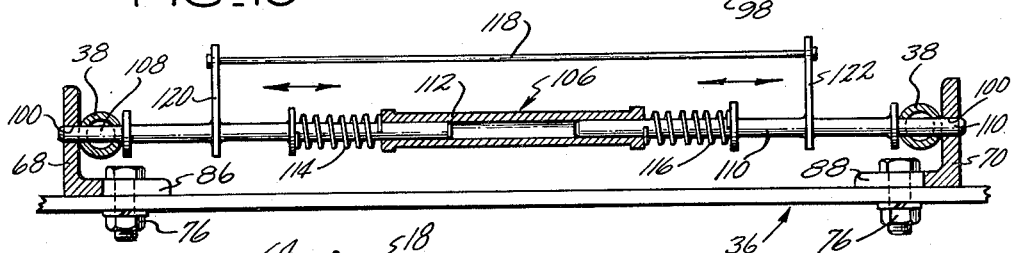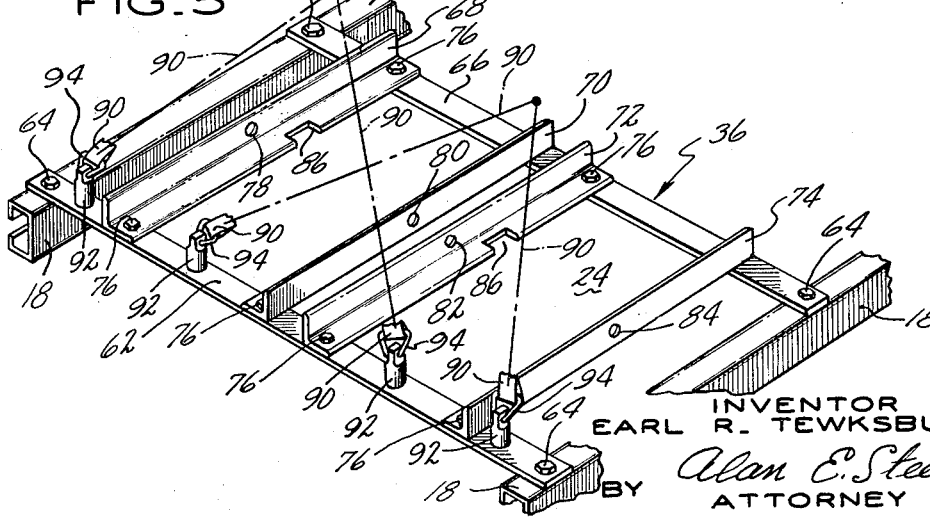

E. R. TEWKSBURY 3,188,133

REMOVABLE AND REVERSIBLE AUTOMOBILE
TRUNK SEAT APPARATUS

Filed Dec. 21, 1961

INVENTOR
EARL R. TEWKSBURY

BY *Alan E. Steele*

ATTORNEY

United States Patent Office 3,188,133
Patented June 8, 1965

3,188,133
REMOVABLE AND REVERSIBLE AUTOMOBILE TRUNK SEAT APPARATUS
Earl R. Tewksbury, R.F.D. 151, Rockfall, Conn.
Filed Dec. 21, 1961, Ser. No. 161,054
12 Claims. (Cl. 296—65)

This invention relates to automobiles and more particularly to two added seats for use in automobile trunk compartments.

An automobile suited to carry five or six passengers and a sizable amount of luggage in the trunk space, usually rides about with the trunk space empty. I have now found a utility for this trunk space by replacing the trunk lid with an easily removable cover and have installed a very small volume of framework to receive removable and reversible seats. Therefore, if one wishes to carry luggage or inanimate bulk in the trunk space, the seats are removed and he has the stowage space normally provided for. However, when one is not carrying such bulk, the seats are placed in the trunk and one not only has room for two more passengers but on fair weather days his passengers can enjoy the luxury of riding without a roof above their head. Passengers who ride in this space normally face forward. However one can use this space for fishing, attending drive-in movies or shows by backing the car up to a stream, lake or stage and reversing these seats so that they are now facing rearward and thereby fish or watch a show in the open air without any view obstructions.

It is an object of this invention to teach reversible seats for use in automobile trunk compartments which includes a frame unit positively attached to the auto frame and preferably two seat units which are easily and releasably attachable to or detachable from the frame. Each of these seat units includes two flat seat and back rest members which are pivotally attached to the frame so that they can be pivoted to a stowed position and pivoted to form either a forwardly directed seat arrangement or a rearwardly directed seat arrangement.

It is a further object of this invention to teach such a reversible seat arrangement including apparatus to position and lock the seat in the desired position.

It is still a further object of this invention to teach such a reversible seat arrangement which includes provisions for integrally attaching seat belt sets to the seat frame which is in turn attached to the car frame.

It is still a further object of this invention to teach such a reversible seat arrangement having padded protection along the automobile body aperture at the top of the trunk compartment to protect the passenger during quick stops.

Other objects and advantages will be apparent from the specification and claims and from the accompanying drawings which illustrate an embodiment of the invention.

FIGURE 1 is an illustration of a conventional automobile having body and chassis and illustrating a trunk utilizing my reversible seat arrangement.

FIGURE 2 is similar to FIG. 1 and shows the rear portion of an automobile with the trunk broken away to illustrate my reversible seat arrangement in its stowed or inoperative position.

FIGURE 3 is similar to FIG. 2 but shows my reversible seat arrangement forming a forwardly directed seat and backrest unit.

FIGURE 4 is similar to FIG. 2 but shows my reversible seat arrangement forming a rearwardly directed seat and backrest unit.

FIGURE 5 is a showing of a portion of the support frame for my reversible seats to illustrate how they attach to the automobile chassis or frame and to further illustrate how they carry seat belt attachment apparatus.

FIGURE 6 is a top view of an automobile trunk compartment showing one of my reversible seat units in its forwardly directed position and with the second reversible seat removed to more fully illustrate the support frame.

FIGURE 7 is similar to FIG. 6 but shows a side view of my reversible seat arrangement as attached to the support frame which is in turn attached to the automobile chassis or frame.

FIGURE 10 is an enlarged section taken along line 10—10 of FIG. 6 to illustrate the quick attach-detach mechanism used to lock my reversible seat arrangement to the support bracket and which also permits the easy release of the seat arrangement for removal from the trunk compartment.

FIGURE 11 is an enlarged showing of the seat belt attachment means connecting the seat belt to my reversible seat frame.

FIGURE 12 is a showing taken along line 12—12 of FIG. 7 to illustrate a further connection between my reversible seat arrangement and its support frame.

Figure 8:
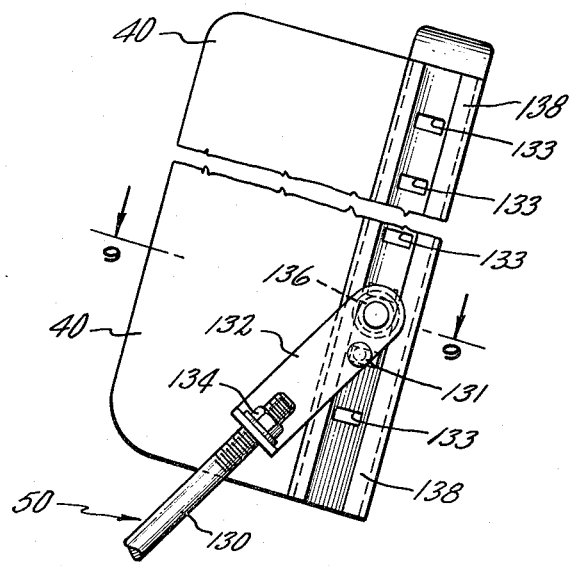
FIGURE 8 is an enlarged showing taken along line 8—8 of FIG. 6 to illustrate the track and roller connection between my seat unit and the expandable support bar which locks the seat in position.

Referring to FIG. 1 we see conventional modern automobile 10 having a forward end 12 and a rearward end 14 and which includes an automobile body 16 attached to and supported by an automobile chassis or frame 18 (FIGURES 5, 6, and 7) and which includes automobile wheels 20. Automobile body 16 includes the conventional passenger compartment 22 as well as trunk compartment 24. Access is available to trunk compartment 24 through aperture 26 in automobile body 16. Preferably, the conventional trunk lid is removed for use with my invention and a readily attachable and detachable cover 28 extends across trunk aperture 26 and is supported in position by a plurality of conventional snap fasteners 30 which extend around the periphery of trunk aperture 26 on the body 16. When connected to fasteners 30, cover 28 seals off trunk compartment 24 for protection from weather and the like. While not necessarily so limited cover 28 may include a central longitudinal zipper 32 to permit removal of one half of cover 28 independently of the other half should but one of my reversible seats be used at a given time.

For a general operation of my reversible seat unit, reference will now be made to FIGS. 2, 3, and 4 and while one such seat unit is illustrated in each case, it should be borne in mind that there are preferably identical left hand and right hand seat units within the trunk compartment 24.

Referring to FIG. 2 we see my reversible seat unit 34, in its stowed or retracted position while the seat unit 34 is shown in its forwardly directed position in FIG. 3 and in its rearwardly directed position in FIG. 4. It will be noted that support frame 36 is attached to the body frame or chassis in a fashion to be described hereinafter and serves to support seat support frames 38 in position. The rearward flat member 40 is pivotally attached to rearward pivot station 42 of seat support frame 38. Forward or front flat member 44 is pivotally attached to seat support frame 38 at forward pivot station 46. By viewing FIGS. 2 through 4, it will be noted that rearward end 42 and forward end 46 of support frame 38 are spaced a greater distance apart than the height (substantially horizontal dimension in FIG. 2) of flat members 40 and 44 and that ends 42 and 46 are elevated different distances above the trunk space floor and frame 36. It is this construction of frame 38 which permits flat members 40 and 44 to assume their FIGS. 2, 3 and 4 positions.

Referring to FIG. 2 is will be noted that forward flat member 44 has been pivoted counterclockwise about pivot station 46 to rest against bar 39 which extends between and is connected to seat support frames 38 so that flat member 44 is in a substantially horizontal position while rearward flat member 40 is pivoted forwardly or clockwise about pivot station 42 to a substantially horizontal position wherein it overlaps flat member 44 in juxtapositioned relationship. With seat unit 34 as shown in FIG. 2, the seat unit is in its stowed or inoperative position wherein expandable support rod 50 is in a position of rest performing no operative function.

Referring to FIG. 3 we see my reversible seat unit 34 in its forwardly directed position. Flat member 40 is pivoted in a counterclockwise direction about pivot station 42 to a substantially vertically extending position where it forms a backrest while flat member 44 remains in the horizontal position described in connection with FIG. 2 to form a seat member. Expandable support rod 50 extends between and is connected to support flat members 40 and 44 to lock the flat members in the desired relative position in any conventional fashion such as a position stop in channel 138 or a plunger in bar 50 received in an aperture in channel 138 (not shown). It will be noted that cushioning or padding 52 and 54 which is shown on one side of flat members 40 and 44 could as well be used on both sides.

Referring to FIG. 4 we see my retractable seat unit 34 in its rearwardly directed seat position wherein flat member 44 has been pivoted in a clockwise position about pivot station 46 into a substantially vertical position where it forms a rearwardly directed backrest. Expandable support rod 50 extends between flat member 44 and support frame 36 where it contacts a positive stop (not shown) on frame 36 to position flat member 44. In the FIG. 4 position flat member 40 is pivoted in a clockwise direction about pivot station 42 until it rests against support frame 38, to form a substantially horizontal seat cooperating with the backrest formed by flat member 44 to define a rearwardly directed seat unit. If desired, cushions 55 and 56 may be placed against flat members 40 and 44 but these obviously are not necessary and would not be used if the flat members 40 and 44 were padded on both sides.

Again referring to FIG. 3 it will be noted that buoyant padding unit 60 extends along the forward periphery of trunk aperture 26 and preferably includes snap attachments to connect to attachments 30 on the automobile to provide a cushion for the passenger at times of quick stopping.

Referring to FIGS. 5 through 7 we see support frame 36 in greater particularity. Frame 36 includes rearward horizontal bar 62 which extends between and is rigidly attached to the forwardly and rearwardly extending frames of automobile chassis 18 by any convenient means such as bolt units 64. It will be obvious to those skilled in the art that wherever bolts are used in my support frame 36, welding or other type of physical attachment could as well have been used but it is considered that greater flexibility relative to removability of the reversible seat units from the trunk compartment 24 is available with the use of bolts. Forward or front horizontal bar 66 extends parallel to rear horizontal bar 62 and also extends between and is attached to the forwardly and rearwardly extending channels of chassis 18 by bolts 64. Laterally spaced and forwardly and rearwardly directed angle bars 68, 70, 72 and 74 extend between horizontal bars 62 and 66 in parallel fashion and are attached thereto by bolt members 76. Angle bars 68 and 70 support left hand seat unit 34 while angle bars 72 and 74 support right hand reversible seat unit 34. It will be noted that the angle bars 68, 70, 72 and 74 include laterally aligned lock holes or apertures 78, 80, 82 and 84 in the vertically extending member thereof and also include recesses such as 86 and 88 in the horizontal extending members thereof such that the recesses of angle bar 68 and 70 face one another as do the recesses of angle bars 72 and 74.

It will be noted that the portion of frame 36 shown in FIGURE 5 can be removed from trunk compartment 24 by the release of bolts 64 but that when assembled it connects to the channels of chassis 18 and thereby provides maximum support for the frame and hence the seat units which attach to it. Further, while seat belts conventionally attach to automobile seats, an advantage of my invention lies in the fact that the seat belts 90 are attached to fastener unit 92 through overlapping clip unit 94 and that fastener 92 is attached to horizontal bar 62 of frame 36, as best shown in FIG. 11, where nut 96 is shown to engage threaded connection 98 of fastener 92.

Referring to FIG. 6 it will be noted that there is a seat support frame 38 on each side of each of my reversible seat units 34 and each of these seat support frames 38 is attached to an angle bar 68, 70, 72 and 74 at pivot station 100 in a fashion to be described hereinafter in connection with the description of FIG. 10. Each seat support frame 38 also includes a rearwardly directed angle member 102 which is attached thereto, preferably pivotally, at station 104 through bar 105 which extends between frames 38 while angle member 102 extends downwardly therefrom. Angle member 102 is made of such a width that it can pass downwardly through angle bar recesses such as 86 and 88 and then become off-set with respect thereto to permit the connection of seat unit 34 to frame 36.

This connection which is of the quick disconnect type is best shown in FIG. 10 wherein expandable bar or lock unit 106 includes plungers 108 and 110 which are urged outwardly from cylindrical housing 112 by springs 114 and 116 to pass through the laterally aligned holes in seat support frames 38 and the vertically extending members of angle bars such as 68 and 70. With lock member 106 in this FIG. 10 position it will be seen that the seat unit 34 which is carried by seat support frames 38 is locked in position and attached to frame 36. Lock unit 106 includes flexible cable member 118 extending between bars 120 and 122, which extend from and are attached to plungers 108 and 110, such that by gripping the center of flexible cable 118 and pulling it away from housing 112, members 120 and 122 will compress springs 114 and 116 in causing plungers 108 and 110 to recess into housing 112, thereby releasing seat unit 34 and seat unit support members 38 from frame unit 36.

While referring to FIGS. 6 and 7 it will be noted that previously alluded to expandable support bar 50 extends between flat members 40 and 44 when these members are in their forwardly directed seat position and that expandable support bar 50 pivotally attaches to flat member 44 at station 124. A similar support bar 126 is positioned on the opposite side of seat unit 34 from expandable bar 50 and is also pivotally attached to flat member 44 at station 128, and passes behind flat member 40 at its opposite end when angle member 130 engages the rearward side of flat member 40. Bar 131 connects support bars 126 and 50.

Figure 9:
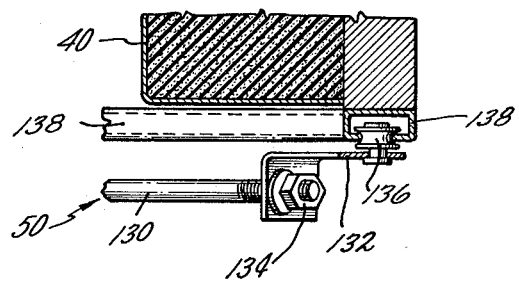
FIGURE 9 is a showing taken along line 9—9 of FIG. 8 to more fully illustrate the co-action between the seat runner and the expandable support bar.

Expandable support bar 50 is shown in greater particularity in FIGS. 8 and 9. It will be noted that member 50 includes threaded bar 130 which engages clip 132 as nut 134 engages the threaded end of bar 130. This provides an expandable section to support bar 50. At the end of support bar 50 opposite to its pivotal connection to flat member 44 at station 124, clip unit 132 carries a roller member 136 which is contoured to be received in channel member 138 extending along flat member 40. As flat member 40 is rotated from its FIG. 2 to its FIG. 3 position, roller 136 of expandable bar 50 is caused to enter channel 138 of the flat member 40 and when the flat member 40 reaches the desired substantially vertical position shown in FIG. 3, bar 50 locks flat members 40 and 44 in the FIG. 3 forwardly extending seat position. Any conventional lock may be used such as plunger 131, which may or may not be keyed or spring loaded, which projects into slots 133, best shown in FIG. 8.

By referring to FIGS. 1 through 4 it will be noted that foot plate members 140 and 142 extend from the body 16 of automobile 10 and are positioned to assist the passenger in entering trunk compartment 24 to use seat units 34. In addition, hand grip units such as 150 are attached to and positioned selectively on body 16 to further assist the passenger.

In operation, the passenger will approach automobile 10 in its FIG. 1 condition and remove cover 28, whereupon he will ascend foot pedals 140 and 142 and may either then raise flat member 40 and connecting bar 50 to the FIG. 3 forwardly operating position or rotate both flat members 40 and 42 and support bar 50 to the FIG. 4 rearwardly operating position. It may be found to be more convenient to step onto the back surface of flat member 40 in its FIG. 1 position and foot pedals 160 are provided for this purpose, and from this position the other reversible seat unit 34 may be operated from very close proximity. After sitting on the seat unit 34 so operated, the passenger may then operate the other reversible seat unit 34 on which he has previously been standing.

It is to be understood that the invention is not limited to the specific embodiment herein illustrated and described but may be used in other ways without departure from its spirit as defined by the following claims.

I claim:

1. A reversible seat arrangement adapted for use in an automobile trunk space comprising a support frame having a first end and a second end spaced from said first end and being elevated from the space trunk floor a different distance than said first end, a first substantially flat member of less height than the spacing between said support frame ends and being pivotally connected to said frame first end, a second substantially flat member spaced from said first member and of less height than the spacing between said support frame ends and being pivotally attached to said frame second end so that said flat members may be pivoted toward one another into a substantially horizontal, stowed position, and further so that said first member may be pivoted to a substantially vertical position while said second member remains in said substantially horizontal position thereby forming a first seat and backrest arrangement facing in a first direction, and still further so that said second member may be pivoted to a substantially vertical position while said first member is in said substantially horizontal position thereby forming a second seat and backrest arrangement facing in a second direction opposite to said first direction, and means to support said members in said substantially vertical positions and said substantially horizontal positions when said members are forming said first and second seat and backrest arrangements.

2. A reversible seat arrangement adapted for use in an automobile trunk space comprising seat support frame means, a first substantially flat member pivotally connected to said frame means, second substantially flat member spaced forward from said first member and pivotally attached to said frame means, said frame means being shaped so that said flat members may be pivoted toward one another into an overlapping, substantially horizontal, stowed position, and further so that said first member may be pivoted to a substantially vertical position while said second member remains in said substantially horizontal position thereby forming a forwardly facing seat and backrest, and still further so that said second member may be pivoted to a substantially vertical position while said first member is in said substantially horizontal position thereby forming a rearwardly facing seat and backrest, means to support said flat members in said vertical and said horizontal positions when said members are forming said forwardly facing seat and backrest and said rearwardly facing seat and backrest, and quick connect-disconnect means comprising cooperating opposed plungers adapted to connect said frame means to the automobile.

3. A reversible seat arrangement adapted for use in an automobile trunk space comprising a frame attached to said trunk space, a seat support frame having a first end and a second end spaced from said first end and being elevated from the space trunk floor a different distance than said first end, means to connect said seat support frame to said frame, a first substantially flat member of less height than the spacing between said support frame ends and being pivotally connected to said frame first end, a second substantially flat member spaced from said first member and of less height than the spacing between said support frame ends and being pivotally attached to said seat support frame second end, so that said flat members may be pivoted toward one another into an overlapping, substantially horizontal, stowed position, and further so that said first member may be pivoted to a substantially vertical position while said second member remains in said substantially horizontal position thereby forming a first seat and backrest arrangement facing in a first direction and still further so that said second member may be pivoted to a substantially vertical position while said first member is pivoted to a substantially horizontal position thereby forming a second seat and backrest arrangement facing in a second direction opposite to said first direction, an expandable support rod extending between and connected to said flat members to lock said members in position in said first arrangement and said support rod being attached to and pivotable with respect to said second flat member and of selected length so that said support rod extends between said second member and said frame attached to said trunk space to support said second member in a substantially vertical position when said flat members are forming said second seat and backrest arrangement.

4. A reversible seat arrangement adapted for use in an automobile trunk space comprising a support frame means, a first substantially flat member pivotally connected to said frame means, a second substantially flat member spaced from said first member and pivotally attached to said frame means, said frame means being shaped so that said flat members may be pivoted toward one another into an overlapping, substantially horizontal, stowed position, and further so that said first member may be pivoted to a substantially vertical position while said second member remains in said substantially horizontal position thereby forming a first seat and backrest arrangement facing in a first direction and still further so that said second member may be pivoted to a substantially vertical position while said first member is in said substantially horizontal position thereby forming a second seat and backrest arrangement facing in a second direction opposite to said first direction, quick connect-disconnect means comprising spring loaded, opposed plungers adapted to connect said frame means to the automobile, and a readily attachable-detachable expandable support rod extending between and connected to said flat members to lock said members in position in said first arrangement and extending between said second member and said frame to support said members in said second arrangement.

5. An automobile having a body and a chassis supporting said body, said body including a trunk comprising a compartment within the interior of said body with access thereto through an aperture in said body, a reversible seat arrangement in said trunk compartment comprising a support frame attached to said chassis, and having first aligned holes therein, seat support frame means connected to said support frame and having second aligned holes therein aligned with said first aligned holes, quick connect-disconnect means comprising opposed, spring loaded plungers adapted to be received in said first and second aligned holes and thereby connect said seat support frame means to said support frame, at least one first substantially flat member pivotally connected to said frame means, at least one second substantially flat member spaced from said first member and pivotally attached to said frame means, said frame means being shaped so that said flat members may be pivoted toward one another into an overlapping, substantially horizontal, stowed position, and further so that said first member may be pivoted to a substantially vertical position while said second member remains in said substantially horizontal position thereby forming first a seat and backrest arrangement, facing in a first direction and still further so that said second member may be pivoted to a substantially vertical position while said first member is in said substantially horizontal position thereby forming a second seat and backrest arrangement facing in a second direction opposite to said first direction, and means to support said members in said vertical positions and said horizontal positions when said members are forming said first and second seat and backrest arrangements.

6. An automobile having a forward end and an after end as well as a body and a chassis supporting said body, including a trunk comprising a compartment within the interior of said body with access thereto through an aperture in said body, a reversible seat arrangement in said trunk compartment comprising a support frame attached to said chassis, and having first aligned holes therein, seat support frame means connected to said support frame, and having second aligned holes therein aligned with said first aligned holes, quick connect-disconnect means comprising opposed, spring loaded plungers adapted to be received in said first and second aligned holes and thereby connect said seat support frame means to said support frame, means to retract said plungers from said first and second aligned holes at least one first substantially flat member pivotally connected to said seat support frame means, at least one second substantially flat member spaced forward from said first member and pivotally attached to said seat support frame means, said frame means being shaped so that said flat members may be pivoted toward one another into an overlapping, substantially horizontal, stowed position, and further so that said first member may be pivoted to a substantially vertical position while said second member remains in said substantially horizontal position thereby forming a forwardly directed seat and backrest arrangement and still further so that said second member may be pivoted to a substantially vertical position while said first member is in said substantially horizontal position thereby forming a rearwardly directed seat and backrest arrangement, support rod means adapted to support said members in both said forwardly directed and said rearwardly directed arrangement and including a runner attached to said first member and a roller attached to one end of said support rod with said roller engaging said runner to be movable therewithin and with the other end of said support rod pivotally attached to said second member.

7. An automobile having a chassis and a trunk compartment, a reversible seat arrangement in said trunk compartment comprising a support frame attached to said automobile, said support frame comprising a first horizontal laterally extending bar attached to said chassis, a second horizontal laterally extending bar attached to said chassis and located forward of said first bar, two laterally spaced angle bars extending between and attached to said horizontal bars and each including an aperture and a recess in lateral alignment with a respective aperture and recess of the other angle bar, two laterally spaced seat support frames having laterally aligned apertures and further having arms pivotally connected to and supporting said seat arrangement, an angle member attached to and extending downwardly from each seat support frame and being shaped to pass through said angle bar recess and to be offset therefrom to bring said seat support frame apertures and said angle bar apertures into lateral alignment while physically engaging said angle bars, and readily expandable and retractable rod means extending through said laterally aligned apertures to attach said seat arrangement support frames to said angle bars and such that the retraction of said rod means will free said seat arrangement and seat support frames for removal from said trunk compartment.

8. Apparatus according to claim 7 and including seat belt attachment means attached to said first horizontal bar.

9. Apparatus according to claim 7 and including a cover member covering said trunk aperture, and readily detachable means attaching said cover to said automobile body.

10. Apparatus according to claim 7 and including buoyant padding extending across the forward portion of said trunk aperture, and readily detachable means connecting said padding to said automobile body.

11. Apparatus according to claim 7 and including footstep and hand grip members attached to said automobile body positioned to assist in entering said trunk compartment.

12. Apparatus according to claim 7 and including support means adapted to support said seat arrangement in both a forwardly directed and a rearwardly directed arrangement.

References Cited by the Examiner

UNITED STATES PATENTS

| | | | |
|---|---|---|---|
| 1,002,305 | 9/11 | Pattinson | 297—376 X |
| 1,440,899 | 1/23 | Stubblebine | 297—92 |
| 1,962,528 | 6/34 | Rope | 296—65 |
| 2,677,574 | 5/54 | Golubics | 296—66 |
| 2,681,098 | 6/54 | Bijold | 296—63 |

FOREIGN PATENTS

| | | |
|---|---|---|
| 573,775 | 3/58 | Italy. |
| 656,194 | 12/28 | France. |

LEO FRIAGLIA, PHILIP ARNOLD, *Examiners.*

A. HARRY LEVY, *Primary Examiner.*